United States Patent
Dourra et al.

(10) Patent No.: US 7,179,189 B2
(45) Date of Patent: Feb. 20, 2007

(54) SWAP SHIFT CONTROL

(75) Inventors: Hussein A Dourra, Bloomfield, MI (US); Ali M Mourtada, Dearborn Heights, MI (US); David L Kwapis, Auburn Hills, MI (US); Maurice B Leising, Clawson, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 121 days.

(21) Appl. No.: 11/021,607

(22) Filed: Dec. 23, 2004

(65) Prior Publication Data
US 2006/0142106 A1 Jun. 29, 2006

(51) Int. Cl.
*F16H 31/00* (2006.01)
(52) U.S. Cl. .................................................. 475/123
(58) Field of Classification Search ................ 475/123, 475/125, 127
See application file for complete search history.

(56) References Cited

U.S. PATENT DOCUMENTS
4,220,058 A * 9/1980 Petzold ...................... 475/125

\* cited by examiner

*Primary Examiner*—Dirk Wright
(74) *Attorney, Agent, or Firm*—Ralph E. Smith

(57) ABSTRACT

An automatic transmission for a vehicle includes an input shaft, an output shaft, a first and second plurality of gears, and a series of engagement elements. The series of engagement elements includes at least one overrunning engagement element in mechanical communication with the second plurality of gears. A controller is operable to disengage a first engagement element associated with a first one of the first plurality of gears and apply a second engagement element associated with a second one of the first plurality of gears to achieve a speed change of the first plurality of gears. The controller is adapted to disengage one of the overrunning engagement elements from engagement with one of the second plurality of gears within a range of 20 to 120 milliseconds after the speed change of the first plurality of gears to accomplish a gear shift of the transmission.

23 Claims, 3 Drawing Sheets

|      |       | ELEMENTS APPLIED |   |   |   |   |   |   |   |
| ---- | ----- | - | - | - | - | - | - | - | - |
| GEAR | RATIO | A | B | C | D | E | F | G | H |
| 1    | 3.921 | X |   |   |   | X | X |   | X |
| 2    | 2.699 | X |   |   |   | X |   | X |   |
| 3    | 2.169 | X |   |   | X |   | X |   | X |
| 4    | 1.379 | X | X |   |   |   | X |   | X |
| 4'   | 1.494 | X |   |   | X |   |   | X |   |
| 5    | 0.95  | X | X |   |   |   |   | X |   |
| 6    | 0.655 |   | X |   | X |   |   | X |   |
| R    | 3.054 |   |   | X |   | X | X |   |   |

FIG 2

SWAP SHIFT CONTROL

FIELD OF THE INVENTION

The present invention relates to transmissions and more particularly to a six-speed transmission incorporating a double-swap shift control scheme.

BACKGROUND OF THE INVENTION

Generally, conventional automatic transmissions include a torque converter to transfer engine torque from an engine to an input of the transmission, planetary gearsets that provide various gear ratios of torque and thus various drive speeds, and fluid pressure-operated, multi-plate drive or brake clutches and/or brake bands that are connected to the individual elements of the planetary gearsets in order to allow shifts between the various gear ratios In addition, some conventional automatic transmissions include one-way clutches (i.e., overrunning clutches) that cooperate with the multi-plate clutches to optimize power shift control and include a transmission controller for selectively applying and releasing elements to shift the gears. For example, the controller chooses the proper gear depending on system conditions such as the shift-program selected by the driver (i.e., Drive, Reverse, Neutral, etc.), the accelerator position, the engine condition, and the vehicle speed.

As an accelerator is further depressed, and the vehicle increases speed, the controller disengages appropriate clutches to sequentially shift up through each of the gears until the highest gear is engaged. Specifically, the controller initiates a "single swap" event that releases an engaged clutch and applies an idle clutch such that a shift from a lower gear to a higher gear is accomplished. As can be appreciated, the application and release are preferably controlled and timed such that a driver does not notice or feel the gear shift.

Once the highest gear is engaged, further depression of the accelerator will cause the controller to operate another single swap event such that a lower gear is chosen, and a requisite torque is supplied by the transmission. In this manner, the controller will downshift through the gears, each time applying and releasing a single pair of clutches to perform the requisite gear shift.

Thus, conventional transmissions only use a single applying clutch and a single releasing clutch for each individual shift event. Conventional transmissions do not use a "double swap" event involving more than two clutches to achieve a desired gear ratio. Therefore, while conventional transmissions adequately accomplish gear shifts that meet driving conditions through use of "single swap" events, some conventional transmissions, depending on the gear set arrangements, suffer from the disadvantage of not being able to use desirable and available gear ratios, as the exchange of clutches required to achieve the desired ratio involves more than two clutches. The transmission controls, thus, do not use all available gear ratios and thereby limit the driveability, performance and fuel economy of the transmission.

Therefore, a transmission capable of performing a double swap, to provide a desired gear ratio, is desirable in the industry. Furthermore, a transmission that reduces the requisite number of clutches and gears through use of double swap operations is also desirable.

SUMMARY OF THE INVENTION

An automatic transmission for a vehicle, including an input shaft, an output shaft, a first plurality of gears, a second plurality of gears, and a series of engagement elements movable between an engaged position and a disengaged position is provided. The series of engagement elements includes at least one overrunning engagement element in mechanical communication with the second plurality of gears. A controller selectively applies and releases the series of engagement elements between the engaged position and the disengaged position to selectively drive through the first plurality of gears and the second plurality of gears to achieve a desired speed ratio between the input shaft and the output shaft.

During a double swap sequence, the controller performs a single-swap upshift in the first plurality of gears, thereby releasing a first engagement element and applying a second engagement element associated with the first plurality of gears to achieve a speed ratio change of the first plurality of gears. When the single-swap shift has progressed to the point that the speed change has started, the controller releases one of the engagement elements associated with the second plurality of gears to achieve a downshift in the second plurality of gears. The release of one of the engagement elements associated with the second plurality of gears is performed so that the speed change in the second plurality of gears begins within a range of 20 to 120 milliseconds after the start of speed change in the first plurality of gears. This sequence provides acceptable shift quality by ensuring that the output torque loss associated with the downshift of the second plurality of gears does not occur until after the output torque loss of the upshift of the first plurality of gears is finished. The output torque from the upshift begins to rise at the beginning of the speed change. Hence, this timing minimizes the total torque disturbance, because the rising torque of the upshift cancels some of the torque loss associated with the downshift.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table showing gear ratio combinations and shift sequences for the transmission of FIG. 1;

DETAILED DESCRIPTION OF THE PREFERRED EMBODIMENTS

Figure 1:
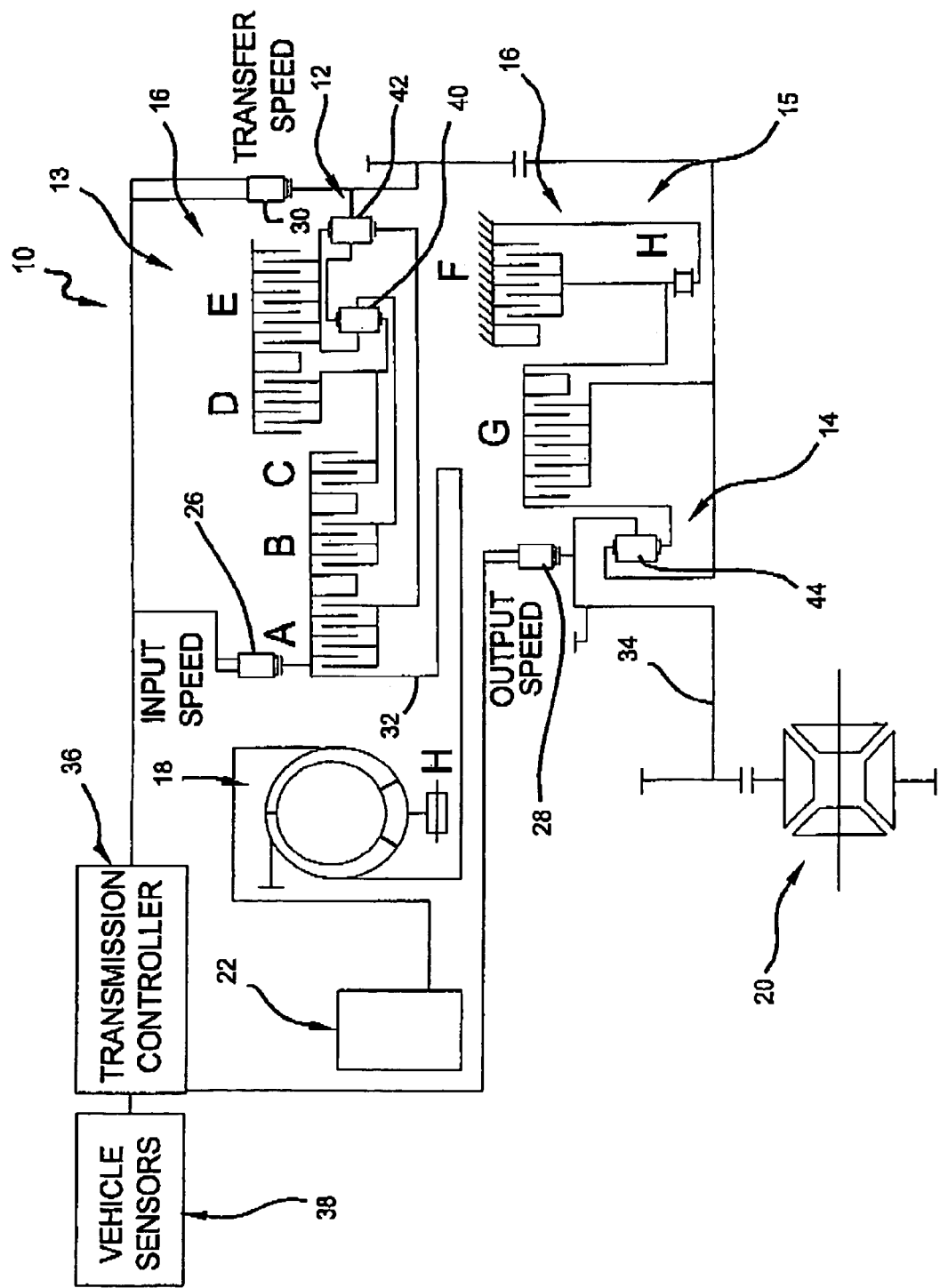
FIG. 1 is a schematic representation of a transmission in accordance with the principals of the present invention.

The following description of the preferred embodiment(s) is merely exemplary in nature and is in no way intended to limit the invention, its application, or uses.

With reference to the figures, a transmission 10 is shown having a main gear set 12 disposed in a main box 13 of the transmission 10, a compounder gear set 14 disposed in an underdrive assembly 15 of the transmission 10, and a series of engagement elements 16. The engagement elements 16 selectively engage respective gears of the main gear set 12 and compounder gear set 14 to provide the transmission 10 with an optimum gear ratio, as will be discussed further below.

With particular reference to FIG. 1, the transmission 10 is shown operably connected to a torque converter 18 and a differential 20. The torque converter 18 is a fluid coupling between a power plant 22, such as, but not limited to, a combustion engine and the transmission 10 and serves to transmit a rotational force from the power plant 22 to the transmission 10. The rotational force received from the power plant 22 via torque converter 18 is then used to drive a combination of the main gears 12 and/or compounder gears 14 to provide a desired output of the transmission 10. The output of the transmission 10 is received by the differential 20 for use in driving one or more wheels of a vehicle (not shown) at a desired acceleration and speed.

The transmission 10 further includes an input sensor 26, an output sensor 28, and a transfer sensor 30 that monitor operating conditions of the transmission 10. The input sensor 26 monitors a rotational speed of an input shaft 32, which is generally indicative of the rotational speed of an output of the torque converter 18, while the output sensor 28 serves to monitor a rotational speed of an output shaft 34 of the transmission 10. The transfer sensor 30 monitors a speed of rotation of an output of the main gears 12 for use in determining which of the compounder gears 14 to engage to optimize transmission output, as will be discussed further below.

Each of the sensors 26, 28, 30 are connected to a transmission controller 36 and provide the controller 36 with operating conditions of the transmission 10. The transmission controller 36 uses the operating data in conjunction with vehicle data received from vehicle sensors 38 in an effort to determine an optimum gear ratio for the transmission 10. Vehicle sensors 38 monitor vehicle speed and operator inputs, such as braking and accelerator pedal position. Selection of the optimum gear ratio provides the differential 20 with an appropriate input via output shaft 34, and thus, enhances the performance of a vehicle to which the transmission 10 may be tied. While the vehicle sensors 38 are described as monitoring vehicle speed, braking, and accelerator pedal position, it should be understood that such parameters are exemplary in nature and are therefore not limited as such. Other vehicle operating parameters having bearing on transmission gear selection, such as braking, vehicle speed, and accelerator pedal position, are considered within the scope of the present teachings.

The controller 36 adjusts the engagement elements 16 to selectively apply different gears from the main and compounder sets 12, 14 to provide the transmission 10 with an optimum output. As will be described further below, the controller 36 compares current operating conditions of the transmission (i.e., data received from sensors 26, 28, 30) with current vehicle operating conditions (i.e., data received from vehicles sensors 38) to determine an optimum gear ratio, and thus, an optimum transmission output.

The main gear set 12 includes a first and second planetary gear sets 40, 42 while the compounder gear set 14 includes a third planetary gear set 44, as best shown in FIG. 1. The planetary gears 40, 42, 44 provide the transmission 10 with seven different gears and a reverse gear. The engagement elements 16 include a series of individual clutches A–G and an additional "overrunning" clutch H disposed in the under drive assembly 15, which are selectively engaged to provide the transmission 10 with a number of different gear ratios. Specifically, the controller 36, based on current operating conditions of the vehicle and the transmission 10, selectively applies respective clutches A–H to engage varying combinations of planetary gears 40, 42, 44 to provide a desired output gear ratio of the transmission 10.

As best shown in FIG. 2, clutches F and H are seemingly applied at the same time to achieve respective gears. However, it should be understood that clutch H is a so-called "overrunning" clutch and, is therefore, only engaged (i.e., carries torque) when the transmission 10 experiences a positive torque. Conversely, when the transmission 10 experiences negative torque, clutch F is overrunning (i.e., disengaged). Therefore, for positive torque shifts, clutch F is applied/released and is not involved in the torque exchange during positive-torque shifts.

Figure 3:
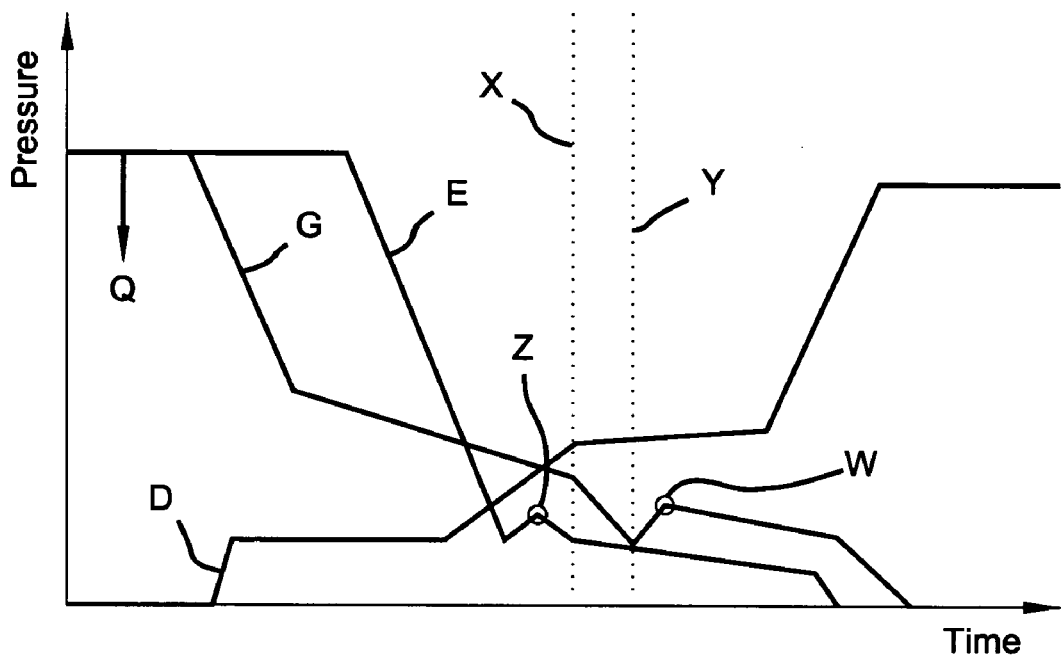
FIG. 3 is a graphical representation of the pressure curves for a double-swap shift sequence.
Figure 4:
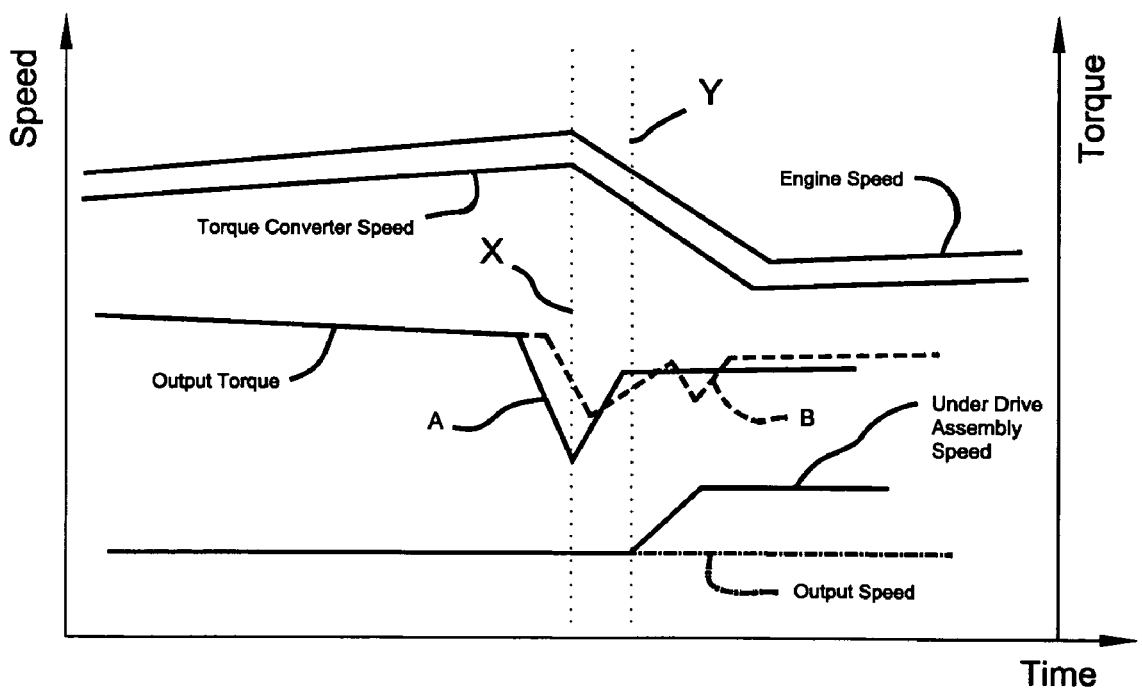
FIG. 4 is a graphical representation of an output torque and speed curves for the double-swap shift sequence of FIG. 3.

With reference to FIGS. 2–4, the operation of the transmission 10 will be described in detail. When the vehicle is at idle, the torque converter 18 freely spins without transmitting a rotational force to the transmission 10 from the power plant 22 (i.e., in a braked or neutral condition). However, once enabled and in a drive mode, a user depresses an accelerator (not shown), and the vehicle sensor 38 sends a signal indicative thereof to the transmission controller 36. As shown in FIG. 2, the controller 36 engages clutch A, E, and F so that the lowest, or first gear combination 1, is selected (each selection represented by an "X" in FIG. 2). It should be noted that while clutch H is not engaged for gear combination 1, that clutch H is always available to carry torque. The lowest gear 1 includes the highest gear ratio (i.e., 3.921), and thus, provides the vehicle with the most torque. As can be appreciated, a higher torque value is desirable in that it provides the vehicle with the greatest acceleration from a rest position.

Once a predetermined speed is achieved, the controller 36 will engage clutch G with clutch H releasing automatically as the torque applied by the gearset drops to zero and becomes negative (the controller 36 will also release clutch F, but it's torque is zero since clutch H is carrying all of the torque). After the speed change is complete, and clutch G is fully engaged, the transmission 10 has shifted sequentially from first gear 1 to second gear 2 and has shifted to a lower gear ratio (i.e., 3.921 to 2.699). The second gear 2 includes a lower gear ratio, and thus, provides less torque to the output shaft 34. However, it should be noted that while maximum torque is sacrificed, the overall efficiency is improved, as engine speed is reduced. The reduction in engine speed provides an increase in efficiency by reducing pumping losses in the power plant 22.

The shift from gear 1 to gear 2 is accomplished by a "single swap" shift such that the gear ratio of the transmission 10 is changed by swapping clutch H, associated with the compounder gear set 14, for clutch G also associated with the compounder gear set 14. FIG. 2 clearly shows that clutches F and H are released or overrunning, and clutch G is engaged, thereby indicating a single swap. Therefore, the shift from gear 1 to gear two 2 is accomplished entirely within the under drive assembly 15 and is a single swap shift.

When the vehicle increases speed, the controller 36 initiates a shift from lower gear 2 to a higher gear 3, thereby changing the gear ratio from 2.699 to 2.169, as best shown in FIG. 3. The shift between gears 2 and 3 is accomplished by a "double swap" shift, meaning that two clutches are released and two different clutches are applied. In this case, two single-swap shifts occur at the same time and make up the "double-swap" shift. First, a 1.8 ratio step upshift is being made in the main gear set 12 while a 1.45 ratio step downshift occurs in the compounder gear set 14. The combination between the 1.8 ratio step upshift and the 1.45 ratio step downshift combine to provide a 1.24 ratio step 2–3 upshift and achieve the third gear ratio of 2.169.

In making the shift from gear 2 to gear 3, the controller 36 disengages clutch E and applies clutch D in the main box 13 and subsequently disengages clutch G and allows the torque to be carried by clutch H in the under drive assembly 15 (clutch F is applied after the shift is complete). The double swap shift only yields an acceptable shift if the shift in the main box 13 is timed correctly with the shift in the underdrive assembly 15, as will be discussed further below.

The main box shift is initiated by the controller 36 in response to vehicle conditions, as read by vehicle sensors 38 and transmission speed sensors 26, 28, and 30. Once the controller 36 indicates that an upshift is required (i.e., from gear 2 to gear 3), the fluid pressure applied to clutch D is increased while the fluid pressure applied to clutch E is decreased, as best shown in FIG. 3. In addition, the fluid pressure applied to clutch G is also reduced to thereby reduce the pressure to a predetermined pressure. The drop in applied pressure eventually disengages clutch E such that clutch E no longer couples gear set 42 to the input and output shafts 32, 34 of the transmission 10. Conversely, the increased pressure applied to clutch D eventually fully applies clutch D such that gear set 40 is coupled to the input and output shafts 32, 34 of the transmission 10.

The release of clutch E and the engagement of clutch D is timed such that the exchange between clutch E and clutch D is slightly overlapped. In general, the releasing element (i.e., clutch E) will maintain some excess capacity until the applying element (i.e., clutch D) has enough capacity to hold engine torque. Once the applying element has enough capacity to hold the engine torque, the releasing element (i.e., clutch E) is disengaged.

FIG. 3 is a graphical representation of the aforementioned power shift from clutch E to clutch D, indicating the respective fluid pressure applied to each clutch E, D. From the plot, it can be seen that clutch E maintains engagement with gear set 42 until a sufficient fill volume is experienced by clutch D. If the controller 36 determines that the swap between clutches E and D is not properly timed (i.e., where a sufficient fill volume is not accurate for clutch D) one of two scenarios is possible.

In a first scenario, clutch D does not have enough capacity when clutch E has lost its capacity. In this situation, the controller 36 slightly increases the pressure of the releasing clutch E to maintain engagement with gear set 42, as indicated by a spike Z in FIG. 3. The slight increase in pressure (Z) is maintained by the controller 36 until clutch D experiences sufficient capacity to prevent slip and maintain engagement gear set 40. The spike Z is released by the controller 36 once there is sufficient capacity exerted on clutch D. Clutch D is being engaged while clutch E is being released to ensure a proper torque swap of the main box 13. In a second scenario, clutch D has capacity while E still has capacity, thereby resulting in an overlap condition. In this situation, the volume of clutch D is modified to match the torque transfer on a subsequent shift.

To complete the shift from gear 2 to gear 3, the under drive assembly 15 must also apply and release a set of clutches. Specifically, clutches F or H must take up the torque and clutch G must be released, as indicated in FIG. 2. The timing of the release of clutch G must be within a predetermined time after the main box 13 slips to ensure a proper output torque transition for the transmission 10, as will be described further below.

Once the main box 13 slips (point X in FIG. 3), the controller 36 will release the pressure applied to clutch G such that clutch G begins to slip at point Y of FIG. 3. As previously discussed, the output torque begins to rise, because main box 13 is beginning the speed change of the upshift. The under drive assembly 15 must slip within a predetermined time after the main box 13 slips to ensure that the downshift torque loss occurs at the same time as the upshift torque rise, thereby minimizing the overall torque disturbance of the 2–3 upshift of transmission 10. To ensure a proper output torque, the time to slip between the main box 13 and the under drive assembly 15 should be within 20 to 120 milliseconds, and preferably between 40 and 70 milliseconds.

The time interval between the slipping of the main box 13 and the slipping of the under drive assembly 15 is generally given as the distance between lines X and Y of FIG. 3. If the under drive assembly 15 slips outside of the 20 to 120 millisecond window, the rate of change of the output torque of the transmission 10 will increase and the shift quality between gears 2 and 3 will deteriorate.

The increase in the rate of change of the output torque is shown in FIG. 4 between lines X and Y. In addition, speed plots for an acceptable speed change (i.e., one falling between points X and Y) are provided indicating torque converter 18, power plant 22 (i.e., engine), under drive assembly 15, and transmission output speed.

If the distance between points X and Y in FIG. 3 is less than 20 milliseconds the output torque curve takes a shape similar to A. If that distance is greater than 120 milliseconds it takes a shape similar to B. While a window between 20 and 120 milliseconds generally results in an acceptable shift, the distance between lines X and Y is preferably between 40 and 70 milliseconds, In addition, the clutch pressures of applying clutch D and releasing clutch G must be controlled to minimize the overall output torque disturbance.

As best shown in FIG. 3, the pressure applied to clutch G is released until clutch G slips. When slip occurs, the controller 36 increases the pressure on clutch G, to minimize the downshift speed change, torque loss, and uses engine torque management to minimize the output torque rise as shown in FIG. 3 at point W which naturally occur at the end of a power downshift. The controller 36 uses open loop control to complete the full release of clutch G within the time in which main box 13 completes its speed change.

The increase in pressure on clutch G when it slips is a function of flow which minimizes the change in clutch pressure and the loss in torque during the downshift. The solenoid duty cycle controlling clutch G is chosen to result in zero flow. Just before the under drive assembly 15 reaches target speed, the pressure applied to clutch G will be decreased using open loop control. If the target speed hasn't been achieved within a 100 milliseconds, the duty cycle control will also enter open loop control.

The hold pressure initial duty cycle applied to control clutch G) is a function of oil temperature and input torque and may therefore be tailored to fit the particular system. To optimize slip time of the under drive assembly 15 with respect to the main box 13, the oil temperature and input torque are monitored to adaptively correct the initial hold pressure (duty cycle) so slip is achieved in the desired 40 to 70 millisecond window. The initial hold pressure (duty cycle) is predicted from an adaptive surface such that the duty cycle required for the hold pressure is a function of oil temperature and input torque. The initial solenoid duty cycle used for the hold pressure is updated at the end of the shift, depending on the X-Y window. If the window is more than desired, the solenoid duty cycle is lowered and vice versa. The duty cycle is generally defined as a percentage a hydraulic fluid valve is open over a given time. Therefore, if slip is falls outside of the 20 to 120 millisecond window, the duty cycle can be increased or decreased to bring the slip within the desired range.

For example, if the slip time overshoots the 120 millisecond threshold, the duty cycle can be increased so as to supply more fluid to the applying clutch. In this manner, the applying clutch will slip sooner as hydraulic fluid is applied in a greater volume over a shorter period of time. Conversely, if the time to slip falls short of the 20 millisecond threshold, the duty cycle can be reduced such that less fluid is applied to the applying clutch over a longer period of time. In this manner, the reduction in duty cycle causes the time to slip to be extended and fall within the desired 20 to 120 millisecond window.

In addition to monitoring oil temperature, the duty cycle (i.e., the rate at which fluid is applied to clutch H) may also be turned off for approximately the first 100 milliseconds following the instruction to shift gears by the controller 36. Toggling the duty cycle off for the first 100 milliseconds of a shift sequence will cause the pressure in clutch H to drop in a direction Q, as best shown in FIG. 3. Such manipulation of the duty cycle is especially important in cases of low input torque. Under such conditions, the time required to achieve speed change with clutch D in the main box might not be enough to reach the required level. As previously discussed, the hold pressure must be at a point that will allow the under drive assembly 15 to slip within 40 to 70 milliseconds after the main box 13 slips. Therefore, if the pressure applied to clutch H is too high initially, the under drive assembly 15 will not slip within the requisite time frame, and therefore the output torque and shift quality will be adversely affected. In the exemplary embodiment of the present invention, turning off the duty cycle for the initial period of time happens when a swap shift is performed.

In addition to the foregoing, the torque input to the system via power plant 22, torque converter 18, and input shaft 32, may also be adjusted using torque management to improve shift quality. As can be appreciated, a lower input torque during the X-Y window will minimize the rate of increase on output torque. Conversely, a higher input torque will require an increase in pressure applied to clutch G to minimize the output torque rate of increase.

Once the gear change is complete, clutches A and D of the main box 13 are engaged, over running clutch H is carrying the torque of the under drive assembly 15 and the gear ratio of the transmission 10 has moved from 2.699 to 2.169 as best shown in FIG. 2.

The controller 36 will sequentially move through each of the remaining gears 3–6 by selectively engaging and releasing clutches A–H until the sixth gear 6 is achieved, as best shown in FIGS. 1–2. The sixth gear 6 is achieved when clutches B, D, and G are engaged and provides the transmission 10 with the lowest torque and the lowest gear ratio (i.e., 0.655). Again, the sixth gear 6 is the highest gear and is engaged when the vehicle is moving at a relatively high speed. Therefore, even though the sixth gear 6 includes a low torque value, a high torque value is not required to propel the vehicle because the vehicle is already in motion, as previously discussed. In this manner, the reduced torque value improves efficiency by choosing the highest gear with the lowest ratio which provides the lowest engine speed and best fuel economy.

At this point, the controller 36 has selectively engaged clutches A–H to sequentially move through each of the first six gears 1–6 until the sixth gear 6 with a gear ratio of 0.655 is selected, as best shown in FIG. 2. At this point, if acceleration is required, the vehicle sensor 38 will send a signal to the controller 36 to downshift the transmission 10.

During the downshift operation, the controller 36 compares vehicle operating conditions to current transmission operating conditions and selects an optimum lower gear to accommodate the requisite acceleration, and will once again repeat the sequential shift sequences, employing the double swap operation to shift from gear 2 to gear 3 and the single swap operation to shift between each of the other gears.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automatic transmission for a vehicle comprising:
an input shaft;
an output shaft;
a first plurality of gears;
a second plurality of gears;
a series of engagement elements operable between an engaged position and a disengaged position, said series of engagement elements including at least one overrunning engagement element in mechanical communication with said second plurality of gears; and
a controller operable to selectively apply and release said series of engagement elements between said engaged position and said disengaged position to selectively couple one of said first plurality of gears and one of said second plurality of gears to said input shaft and said output shaft;
wherein said controller is operable to controllably release a first engagement element coupled to one component of said first plurality of gears and controllably apply a second engagement element coupled to another component of said first plurality of gears to achieve a speed change of said first plurality of gears, said controller adapted to controllably release said one element from engagement with one of said second plurality of gears within a range of about 20 to 120 milliseconds after start of said speed change of said first plurality of gears to accomplish a speed change of said second plurality of gears and a speed change of said first plurality of gears to achieve a gear shift of the transmission.

2. The automatic transmission of claim 1, wherein said engagement elements are clutch assemblies.

3. The transmission of claim 2, wherein said clutch assemblies include multi-plate clutch assemblies.

4. The transmission of claim 2, wherein said clutch assemblies include brake clutches.

5. The transmission of claim 1, wherein said second plurality of gears are arranged to provide different gear ratios than said first plurality of gears.

6. The transmission of claim 1, wherein a pressure of said overriding engagement element is reduced to a hold pressure prior to disengagement of said overriding engagement element.

7. The transmission of claim 6, wherein said hold pressure is a function of oil temperature and input torque.

8. The transmission of claim 6, wherein said hold pressure is adaptively modified based on monitored oil temperature and input torque to correct the initial hold pressure to achieve the desired range of about 20 to 120 milliseconds.

9. An automatic transmission for a vehicle comprising:
a main box housing a first plurality of gears;
an under drive assembly housing a second plurality of gears, said under drive assembly in mechanical communication with said main box;
a series of engagement elements operable between an engaged position and a disengaged position, said series of engagement elements including an overrunning engagement element in mechanical communication with said second plurality of gears; and
a controller operable to selectively toggle said series of engagement elements between said engaged position and said disengaged position to selectively couple one of said first plurality of gears and one of said second plurality of gears to said input shaft and said output shaft;
wherein said controller is operable to disengage said overrunning engagement element from engagement with one of said second plurality of gears within a range of about 40 to 70 milliseconds after said main box begins to slip.

10. The automatic transmission of claim 9, wherein said engagement elements are clutch assemblies.

11. The transmission of claim 10, wherein said clutch assemblies include multi-plate clutch assemblies.

12. The transmission of claim 10, wherein said clutch assemblies include brake clutches.

13. The transmission of claim 9, wherein said second plurality of gears are arranged to provide different gear ratios than said first plurality of gears.

14. The transmission of claim 9, wherein a pressure of said overriding engagement element is reduced to a hold pressure prior to disengagement of said overriding engagement element.

15. The transmission of claim 14, wherein said hold pressure is a function of oil temperature and input torque.

16. A method for controlling, operation of an automatic transmission of a vehicle comprising:
applying a first engagement element to select a gear from a first plurality of gears in a transmission to achieve a desired output speed of said first plurality of gears in response to driver acceleration of the vehicle;
transmitting said output speed of said first plurality of gears to a second plurality of gears;
applying an engagement element to select a first gear from said second plurality of gears in response to said driver acceleration to achieve a desired output speed of said second plurality of gears and a first gear ratio of said transmission;
releasing said first engagement element and applying a second engagement element to select a second gear from said first plurality of gears to achieve an output speed change of said first plurality of gears in response to further acceleration of the vehicle;
transmitting said output speed change from said first plurality of gears to a second plurality of gears; and
releasing said engagement element from said first gear of said second plurality of gears within a range of about 20 to 120 milliseconds after said output speed change of said first plurality of gears to accomplish an output speed change of said second plurality of gears and achieve a second gear ratio of the transmission.

17. The method of claim 16, wherein a pressure of said overriding engagement element is reduced to a hold pressure prior to disengagement of said overriding engagement element.

18. The method of claim 17, wherein if the input torque is lower than a predetermined value, a duty cycle is initially toggled off to regulate fluid pressure to the overriding engagement element so as to set the hold pressure at a point to achieve range.

19. The method of claim 16, wherein said overriding engagement element is reapplied for a predetermined period of time once the second plurality of gears begins to slip to control output torque of said transmission.

20. The method of claim 16, wherein an input torque to said transmission is reduced to control output torque of said transmission.

21. The transmission of claim 6, wherein the hold pressure rapidly decreases at start of shift and then less rapidly decays and reaches zero when speed change is identified.

22. The transmission of claim 2, wherein clutch control of the apply element for the first plurality of gears and the releasing element of the second plurality of gears provides a complete speed change of the second plurality of gears within a speed change time of the first plurality of gears.

23. The transmission of claim 22, wherein a reduction in engine torque at an end of the speed change is used to minimize torque disturbance of the gear shift.

* * * * *